United States Patent Office 3,193,531
Patented July 6, 1965

3,193,531
PROCESS FOR THE PRODUCTION OF HIGH MOLECULAR WEIGHT POLYOXYMETHYLENE ESTERS AND ETHERS WITH A DEFINITE DEGREE OF POLYMERISATION
Karl-Heinz Heller, Krefeld, Germany, assignor to Farbenfabriken Bayer Aktiengesellschaft, Leverkusen, Germany, a German corporation
No Drawing. Filed Apr. 13, 1960, Ser. No. 21,855
Claims priority, application Germany, Apr. 25, 1959, F 28,321
6 Claims. (Cl. 260—67)

The present invention is concerned with a process for the production of high molecular weight polyoxymethylene esters and ethers having a definite degree of polymerization.

Many properties of macromolecular substances are dependent upon the degree of polymerization. In the case of polyoxymethylenes, their stability properties increase with increasing molecular weight, whereas, at the same time, their working up, for example, in the form of a molten liquid, becomes more difficult with increasing molecular weight due to the increasing viscosity of the molten liquid. Products having a definite degree of polymerization are preferred depending on the proposed use and the subsequent treatment to which they are to be subjected. A process which permits the production of polyoxymethylenes having a desired degree of polymerization in a simple manner possesses, therefore, considerable technical interest.

Depolymerization reactions of polyacetals having free hydroxyl end groups, such as the polymethylene dihydrates, brought about by the action of acids take place not only on the acetal bonds, but also on the hydroxyl end groups. Thus, the decomposition of the semi-acetal bonds at the chain ends takes place considerably more quickly than on the acetal bonds of the internal chain members. Further, as is known, polyoxymethylene dihydrates are very quickly depolymerized by the action of acids to lower degrees of polymerization, and finally, to monomers, so that it is almost impossible or exceptionally difficult to terminate the depolymerization at a desired molecular weight.

I have now found that high molecular weight polyoxymethylene diethers and diesters can be subjected to a controllable depolymerization by the action of catalysts of the acidic type in the presence of etherifying or alkylating agents which depolymerization can be terminated when the desired molecular weight is reached, whereby, at the same time, etherified or partially etherified and partially esterified polyoxymethylenes are formed.

By the term "polyoxymethylene dihydrate" is to be understood a polyoxymethylene whose terminal valences are each satisfied by a hydroxyl radical. Likewise "polyoxymethylene diethers" and "polyoxymethylene diesters" are to be understood to refer to polyoxymethylenes whose terminal valences are each satisfied by respectively alkoxy (RO—) radicals and alkoxycarbonyl (RO—CO—) radicals, such as the polyoxymethylene diethyl ethers referred to in Examples 1 and 2 and the polyoxymethylene diacetate referred to in Example 3 hereinafter.

The etherifying or alkylating agents bring about a rapid etherifying or alkylating of the newly formed chain ends resulting from the attack of the acidic catalyst on an oxygen atom of the acetal bond so that the faster depolymerization of the chain ends is substantially prevented and, in general, substantially only the slower and, therefore, controllable depolymerization of the acetal bonds takes place. The presence of the etherifying agent thus exerts a protective action which renders possible the performance of the desired depolymerization.

Since the polyoxymethylenes with free hydroxyl end groups have, as is known, low thermal stability and can only be melted or sintered with decomposition and, therefore, practically cannot be subjected to further working up, a great advantage of the present process is that, in the case of carrying out the controlled depolymerization, the hydroxyl end groups are protected by ether groups so that, at the same time, thermally stable, thermoplastically workable synthetic plastic materials are obtained.

In general, the starting polyoxymethylene diesters or diethers should have a degree of polymerization which corresponds to an intrinsic viscosity ($\eta_i$) not lower than about 1.3. This viscosity is measured in a 0.5 percent solution of polyoxymethylene in 4-chlorophenol, said solution containing additionaly 2 percent of alpha-pinene. The temperature of the solution is maintained at 60° C. Polyoxymethylene derivatives having an intrinsic viscosity of about 2.0 to about 2.5 are especially suitable.

For performing the depolymerization and etherification or depolymerization and partial etherification and partial esterification process of the present invention, those etherifying agents are particularly suitable which can participate in rapid, acid-catalyzed etherification reactions, such as, in particular, the ortho esters of polyhydroxy mineral acids, for example, dimethyl sulphite, tetrabutyl titanate, or tetraethyl silicate, as well as the ortho esters of carboxylic acids, especially the orthocarbonic acid alkyl esters, the orthoformic acid alkyl esters, the orthoacetic acid and the orthopropionic acid alkyl esters, such as the methyl and ethyl esters.

Catalysts of the acid type which are suitable for use for the depolymerization process of the present invention include mineral acids, such as hydrochloric acid, hydrofluoric acid, sulfuric acid, toluenesulfonic acid and phosphoric acid, as well as organic acids, such as formic acid, acetic acid and trichloroacetic acid. Acid compounds of the Lewis type, such as zinc chloride, aluminum chloride, ferric chloride, tin tetrachloride and especially boron trifluoride and its addition compounds with ethers, such as diethyl ether and tetrahydrofuran, have proved to be particularly useful, especially such acid compounds which are soluble in the etherifying agent or in the mixture of etherifying agent and inert diluent. These acids are advantageously used in amounts between about 0.0001 and about 1.0 percent by weight, based on the amount of polyoxymethylene derivatives.

Suitable amounts of etherifying agents are from about 10 to about 1000 percent by weight, based on the amount of polyoxymethylene derivatives.

The reaction can be performed with suspensions of the polyoxymethylene in the form of powder in an excess of the etherifying agent used, but preferably in an inert solvent. As suitable inert solvents there may be mentioned, for example, hydrocarbons, such as benzines ligroin, cyclohexane, dechydronaphthalene, benzene, toluene and xylene and their chlorination products, furthermore ethers, such as dimethyl, diethyl, and dibutyl ether, ethylene glycol ether and dioxane. The reaction proceeds more smoothly in the presence of these diluents since the polymers swell therein.

Polyoxymethylene diesters which can be depolymerized in accordance with the present invention can be produced in known manner, for example, by the action of acid anhydrides, such as acetic acid anhydride, on polyoxymethylene dihydrate. Polyoxymethylene diethers which can be depolymerized in accordance with the present invention can be obtained, for example, by the etherification of the hydroxyl end groups of high molecular weight polyoxymethylenes having an intrinsic viscosity of at least about 1.3, as defined hereinbefore, according to known methods while avoiding substantial depolymerization of the polyoxymethylene.

Pure polyoxymethylene diethers and diesters can be subjected to depolymerization in accordance with the process of the present invention. However, it is also possible to use crude polyoxymethylene diethers, for example, a crude reaction mixture such as is obtained by the conventional etherification process.

In general, the degree of depolymerization depends on the ratio of the amount of catalyst to the amount of etherifying agent, the length of the reaction time and the reaction temperature. To obtain adeqaute protective action, care must be taken to provide a sufficient concentration of the etherifying agent in comparison with the amount of acid introduced.

Increasing the length of the reaction time produces a slower, more readily reproducible depolymerization to polymers of a lower degree of polymerization whose thermal stability is practically the same as that of the original polymer. By using elevated temperatures the depolymerization velocity not only in the chain but also at its ends is considerably accelerated so that depolymerization at elevated temperatures although quicker, can only be performed in a controlled manner in the presence of a large excess of the etherifying agent. Measures that are required to produce a product having a desired degree of polymerization can be determined in each case by simple experimentation.

The comparative degree of polymerization of polyoxymethylenes can be conveniently expressed by reference to their intrinsic viscosities ($\eta_i$). These intrinsic viscosities can be computed as described hereinbefore. For this purpose a 0.5 percent solution of the polyoxymethylene in p-chlorophenol is prepared, said solution also containing 2 percent α-pinene by heating for one hour at 100° C. After cooling to 60° C. the measurement is made at this temperature. The thermal stability as referred to herein is the percentage loss of weight (G) observed after heating a sample of the polyoxymethylene for half an hour at a temperature of 220° C. in an atmosphere of nitrogen.

The following examples are given for the purpose of illustrating the present invention:

EXAMPLE 1

20 grams of a high molecular weight, powdered polyoxymethylene diethyl ether are introduced into 200 milliliters of dry benzene whereby a gel-like suspension results. After the addition of 20 milliliters of orthoformic acid ethyl ester (triethoxymethane) and 50 milligrams of the addition compound of boron trifluoride and tetrahydrofuran, the mixture is placed in a shaker for 24 hours at room temperature, whereby an increasing green coloration of the solution takes place during the course of the reaction. After 24 hours, the mixture is filtered and the product filtered off and washed in succession twice with acetone, water and acetone with vigorous stirring. It is subsequently dried for several hours in a vacuum at a temperature of 60° C. A colorless powdery polyoxymethylene diethyl ether is obtained in 98 percent yield. For determining its degree of polymerization, its intrinsic viscosity $\eta_i$ is computed as described hereinbefore from the observed viscosity at 60° C. of a 0.5 percent solution in p-chlorophenol containing 2 percent alpha-pinene. For determining its thermal stability, the percentage loss in weight (G), after heating for half an hour at 220° C. in an atmosphere of nitrogen, is ascertained. The starting material gives the following values: $\eta_i=1.4$ and $G=10.0–10.5$ percent whereas the treated product gives the following results: $\eta_i=1.2$ and $G=$ about 10.0 percent.

When the above procedure is carried out but the protective action of the triethoxymethane is reduced by adding only 2 milliliters instead of 20 milliliters, then a greater depolymerization takes place. The product treated in this manner possesses an intrinsic viscosity of $\eta_i=0.9$ and its thermal stability as determined by the loss of weight (G) observed on heating a sample of the product at 220° C. for one-half hour in an atmosphere of nitrogen, is 13 percent.

When the above procedure is carried out without the addition of any ortho ester so that no protective action is exerted, a very considerable degree of depolymerization takes place. The intrinsic viscosity decreases to $\eta_i=0.3$ and the thermal stability becomes considerably worse.

EXAMPLE 2

20 grams of a high molecular weight polyoxymethylene dihydrate ($\eta_i=2.2$, $G=38–30$ percent) are etherified by the action, during the course of two hours, of a mixture of 20 milliliters of triethoxymethane, 50 milligrams of boron trifluoride-tetrahydrofuran and 200 milliliters of benzene. By proceeding as described in Example 1, there is obtained in almost quantitative yield a polyoxymethylene diether that has the same intrinsic viscosity as the original polyoxymethylene dihydrate ($\eta_i=2.2$) and improved thermal stability ($G=9–10$ percent).

Since, in the case of the etherification of the end groups of the high molecular weight polyoxymethylene dihydrate, only a very small amount of orthoformic acid ethyl ester is used, the etherifying agent introduced is present in the crude reaction product in very large amounts. The same applies to the amount of boron trifluoride and tetrahydrofuran introduced as catalyst. Consequently, the conditions for the depolymerization of the polyoxymethylene diether resulting from the reaction to the desired degree of polymerization according to the process of this invention are already present in the crude reaction mixture without the addition of further quantities of reactants. The decomposition is conducted in a technically simple manner in such a way that the reaction mixture, according to the desired degree of depolymerization, is allowed to stand for a definite period of time. The result of this depolymerization can be seen from the following summary:

| Test | Reaction period in hours | $\eta_i$ | G, percent |
|---|---|---|---|
| 1 | 4 | 2.0 | 11–10 |
| 2 | 8 | 2.0 | 8–10 |
| 3 | 15 | 1.9 | 9–10 |
| 4 | 24 | 1.5 | 10–11 |
| 5 | 48 | 1.5 | 9–9 |
| 6 | 72 | 1.4 | 7–7 |

By the addition of 0.2–2 percent of an antioxidant, such as di-β-naphthyl-p-phenylene-diamine or another secondary amine or a compound of the phenol series, the product undergoes a further improvement of its thermal stability to G values of less than 4–5 percent. By heating at 180–190° C. for half an hour in an atmosphere of nitrogen, the loss of weight amounts to 0–2 percent.

EXAMPLE 3

20 grams of a polyoxymethylene diacetate having an intrinsic viscosity ($\eta_i$) of 2.2 and a thermal stability (G) of 8 percent, produced in known manner by the acetylation of a high molecular weight polyoxymethylene dihydrate, is introduced into 200 milliliters of dry benzene. In this way, a gel-like suspension results. After the addition of 20 milliliters of orthoformic acid diethyl ester and 50 milligrams of the addition compound of boron trifluoride and tetrahydrofuran, the mixture is left in a shaker for 24 hours at room temperature. The working-up takes place in the manner described in Example 1. A colorless, powdery, high molecular weight reaction product having an intrinsic viscosity ($\eta_i$) of 1.5 and a thermal stability (G) of 10–12 percent is obtained in almost quantitative yield.

I claim:

1. A process for depolymerizing a polyoxymethylene whose terminal valances are each satisfied by a radical of the group consisting of alkoxy and alkoxycarbonyl to obtain a resulting polyoxymethylene whose terminal valences are each satisfied by a radical of the group consisting of alkoxy and alkoxycarbonyl, having a lower intrinsic viscosity than the original polyoxymethylene derivative comprising contacting in an inert solvent at room temperature
  (i) a polyoxymethylene whose terminal valences are each satisfied by a radical of the group consisting of alkoxy and alkoxycarbonyl radicals having an intrinsic viscosity of more than about 1.3, with
  (ii) an etherifying agent of the group consisting of dimethyl sulfite, tetrabutyl titanate, tetraethyl silicate, orthocarbonic acid ethyl ester, orthocarbonic acid methyl ester, orthoformic acid ethyl ester, orthoformic acid methyl ester, orthoacetic acid methyl ester, orthoacetic acid ethyl ester, orthopropionic acid ethyl ester and orthopropionic acid methyl ester and
  (iii) a catalyst of the group consisting of hydrochloric acid, hydrofluoric acid, sulfuric acid, 4-toluenesulfonic acid, phosphoric acid, formic acid, acetic acid, trichloroacetic acid, zinc chloride, aluminum chloride, ferric chloride, boron trichloride, tin tetrachloride, boron trifluoride, and addition compounds of boron trifluoride with a member selected from the group consisting of diethyl ether and tetrahydrofuran.

In amounts such that the etherifying agent (ii) is between 10 and about 1000 percent, and the catalyst (iii) in an amount between 0.001 and about 1 percent, each percentage being by weight of the polyoxymethylene.

2. A process as defined in claim 1 in which the polyoxymethylene that is subjected to contact with the etherifying agent and catalyst has an intrinsic viscosity between about 2.0 and about 2.5.

3. A process as defined in claim 1 in which the inert solvent is a member of the group consisting of benzines, cyclohexane, decahydronaphthalene, benzene, toluene, and xylene, dimethyl ether, diethyl ether, dibutyl ether, dioxane and ethylene glycol ether.

4. A process as defined in claim 1 in which the catalyst (iii) is the addition compound of boron trifluoride and tetrahydrofuran.

5. A process as defined in claim 1 in which the etherifying agent is triethoxymethane.

6. A process which comprises contacting at room temperature a gel-like suspension in benzene of a polyoxymethylene whose terminal groups are ethoxy radicals with triethoxymethane in the presence of a catalytic amount of the addition compound of boron trifluoride and tetrahydrofuran and subsequently recovering the resulting polyoxymethylene whose terminal groups are ethoxy radicals and which resulting polyoxymethylene has a lower intrinsic viscosity than the original polyoxymethylene derivative.

References Cited by the Examiner

UNITED STATES PATENTS

| | | | |
|---|---|---|---|
| 2,189,529 | 2/40 | Caruthers et al. | 260—614 |
| 2,512,950 | 6/50 | Londergan | 260—67 |
| 2,964,500 | 12/60 | Jenkins et al. | 260—67 |
| 2,998,409 | 8/61 | Nogare et al. | 260—67 |

OTHER REFERENCES

Derwent Belgian Patents Reports, No. 66A, July 15, 1960, p. C16.

Derwent Belgian Patents Report, No. 62A, February 1960, p. 422.

Post: The Chemistry of Aliphatic Orthoesters, 1943, ACS Monograph Series No. 92, Reinhold, New York, p. 40.

WILLIAM H. SHORT, *Primary Examiner*.

MILTON STERMAN, HAROLD N. BURSTEIN, *Examiners*.